United States Patent [19]
Corona et al.

[11] Patent Number: 5,208,909
[45] Date of Patent: May 4, 1993

[54] PRE-DRAWING PICK DETECTION IN A GRAPHICS DISPLAY SYSTEM

[75] Inventors: James Corona, Kingston; Daniel G. Gibbons, Ulster Park, both of N.Y.; Terence W. Lindgren, Littleton, Mass.

[73] Assignee: International Business Machines Corporation, Armonk, N.Y.

[21] Appl. No.: 425,777

[22] Filed: Oct. 23, 1989

[51] Int. Cl.⁵ .................... G06F 15/62; G06F 3/14
[52] U.S. Cl. .................... 395/155; 395/134; 395/143
[58] Field of Search .............. 395/155, 134, 157, 143, 395/133, 127; 340/723, 747

[56] References Cited

U.S. PATENT DOCUMENTS

| | | | |
|---|---|---|---|
| 3,889,107 | 6/1975 | Sutherland | 395/121 |
| 4,814,755 | 3/1989 | Johnson et al. | 395/134 X |
| 4,939,672 | 7/1990 | Meadows | 395/133 X |
| 4,941,111 | 7/1990 | Sfarti | 395/157 |
| 4,958,305 | 9/1990 | Piazza | 395/127 X |
| 4,982,345 | 1/1991 | Callahan et al. | 395/155 |
| 5,012,433 | 4/1991 | Callahan et al. | 395/134 |
| 5,031,114 | 7/1991 | Yamagami | 395/134 |

FOREIGN PATENT DOCUMENTS 0156052 10/1985 European Pat. Off. .
0232005 8/1987 European Pat. Off. .
63-245576 10/1988 Japan .

OTHER PUBLICATIONS

IBM Technical Disclosure Bulletin (IBM TDB), vol. 29, No. 5, Oct. 1986, "Method of Correlating on Areas in an Interactive Display System", pp. 1953-1954.
Brackenbury, IBM TDB, vol. 27, No. 1B, Jun. 1984, "Line Clipping in Interactive Computer Graphics", pp. 549-552.

Primary Examiner—Gary V. Harkcom
Assistant Examiner—Raymond J. Bayerl
Attorney, Agent, or Firm—Mark S. Walker; William A. Kinnaman, Jr.

[57] ABSTRACT

A method and apparatus for detecting operator selection of a graphics object prior to rasterization and pixel generation for that object. The method divides the screen into regions and analyzes successive end points and vectors based upon their region to determine trivial picks and trivial no picks. Non-trivial conditions are analyzed by determining the position of the line segment being processed relative to two selected pick window vertices. Apparatus for implementing pick detect is provided that accomplishes pick detect as part of graphics pipeline processing. In the trivial pick or no pick cases, the apparatus does not slow pipeline operation, while in a non-trivial case, extra processing cycles are required.

9 Claims, 5 Drawing Sheets

OUTCODE = LRAB

VECTOR P1→P2 IS NON-TRIVIAL
USE XMIN, YMAX AND XMAX, YMIN IN NON-TRIVIAL LINE EQUATIONS
BOTH POINTS LIE BELOW VECTOR P1→P2' ——→NOT PICKED
BOTH POINTS LIE ABOVE VECTOR P1→P2'" ——→NOT PICKED
BOTH POINTS LIE TO EITHER SIDE OF VECTOR P1→P2" ——→PICKED

| REGION | POINTS SELECTED FOR NON TRIVIAL EQUATION |
|---|---|
| 1 | XMAX, YMAX AND XMIN, YMIN |
| 2 | XMAX, YMAX AND XMIN, YMAX |
| 3 | XMIN, YMAX AND XMAX, YMIN |
| 4 | XMIN, YMAX AND YMIN, YMIN |
| 6 | XMAX, YMAX AND YMAX, YMIN |
| 7 | SAME AS REGION 3 |
| 8 | XMAX, YMIN AND XMIN, YMIN |
| 9 | SAME AS REGION 1 |

PRE-DRAWING PICK DETECTION IN A GRAPHICS DISPLAY SYSTEM

BACKGROUND OF THE INVENTION

1. Field of the Invention

This invention relates in general to computer graphics display systems and more particularly to a processing method and apparatus for identifying a displayed object that intersects an operator selected area of the display screen. The invention more particularly relates to detection of an operator selection prior to detailed rendering of the drawn figure.

2. Description of the Prior Art

Interactive raster graphics systems, such as CAD/CAM workstations, are widely used to design components and systems of mechanical, electrical, electromechanical, and electronics devices. Frequently, the emphasis within such systems is on the operator interaction with a computer based model of a component or system being designed in order to modify or test that component. The computer based model is comprised of numerous graphics objects that are individually processed and displayed for operator action. Selection of the displayed object is accomplished via any one of a number of operator controlled interaction devices such as light pens, locators (e.g., a data tablet with stylus), and alphanumeric and function keyboards. An important part of many interaction sequences is computer identification of an operator selected displayed object to be operated upon, a process known as picking.

Typically, a graphics system processing technique requires the reprocessing of an entire display screen to identify the particular displayed object selected or picked for further processing. More particularly, existing processing methods require the re-execution of the entire display program, including: transformation of each geometric primitive defining a displayed object in world coordinate space; clipping of each transformed primitive against the predefined clipping boundary in world coordinate space; mapping of each clipping primitive to an operator defined viewport and screen coordinate space; rasterization of all mapped data; and finally, determination of whether the generated pixels intersect the operator defined selection area in a window in screen coordinate space. If so, then a pick occurs.

Although effective, a clear drawback to this procedure is the unnecessary processing occurring as a result of mapping and rasterization geometric objects not selected. For example, drawing or rasterization of a filled polygon outside the operator selected screen area is both unnecessary and time consuming.

One attempt to address this problem is discussed in "Interactive Computer Graphics Display Screen Processing Method for Identifying an Operator Selected Displayed Object", U.S. application Ser. No. 299,901, filed Jan. 23, 1989, now U.S. Pat. No. 4,982,345 and commonly assigned. That patent discusses apparatus and method for forming an inverse mapping of the pick window into world coordinate space. This technique allows picking to occur in world coordinate space prior to window to viewport mapping from three dimensional world coordinate space to two dimensional screens. While this technique provides a method to pick earlier in the pipeline cycle and therefore avoid rasterizing objects unnecessarily, it suffers from certain disadvantages. Most notable are the problems encountered when trying to inversely map a two dimensional pick window into three dimensional world coordinate space. Advanced techniques used to map from three to two dimension, such as the use of perspectives, or other selectable features, makes precise inverse mapping of the pick window difficult.

Therefore, an improved apparatus and method for pick detection prior to rasterization and without the limitations of inversely mapped pick windows is needed.

SUMMARY OF THE INVENTION

The present invention is directed to providing a pick detection system that operates efficiently in a pipelined graphics display system. A pick detection system according to the present invention will provide a means and method for efficiently detecting operator selection of a graphic object prior to the rasterization step in a graphics processor.

It is therefore an object of the present invention to provide pick detection logic which does not require full rasterization or drawing of each graphics primitive.

It is a further object of the present invention to provide a simplified pick detection apparatus and method that accurately picks objects from the screen space.

These and other objects of the invention will be described more fully in the Detailed Description of the Preferred Embodiment.

DETAILED DESCRIPTION OF THE PREFERRED EMBODIMENT

The present invention provides a pick detection mechanism for graphics processing systems. The mechanism is particularly suited to graphics display systems employing pipelined processors and an example of its use with a pipelined graphics system will be described herein. However, this pick detection methodology is not limited to use with pipelined processing systems.

Another feature of the present invention is the function known as pick correlation. In a graphics pipeline, many times a bottleneck is the actual drawing of the image by the drawing processor. A display program can frequently be traversed more rapidly if no drawing is attempted. The pick detection hardware according to the present invention, being a pipelined element, can be placed in the mode where it passes no data to the next pipeline element. In this mode, known as pick correlation mode, the graphics processor can execute the display program checking for pick detects without the requirement for drawing objects.

Figure 1:
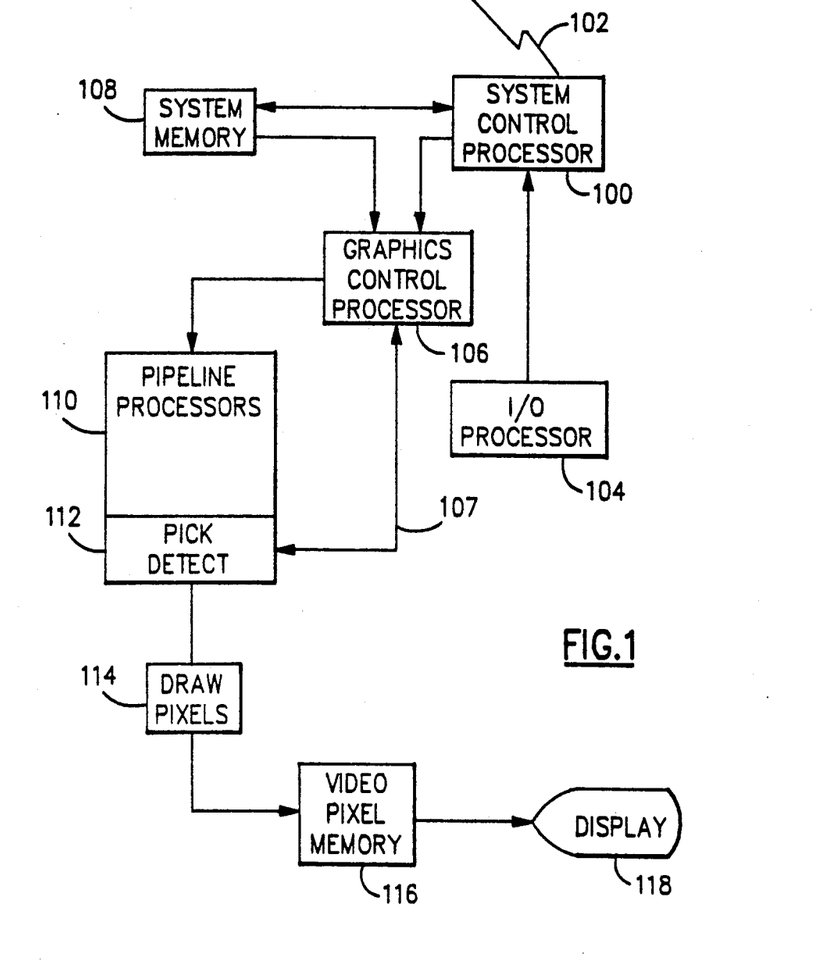
FIG. 1 is a block diagram illustrating a graphics display system incorporating the present invention.

A graphics display system embodying the present invention is shown generally in FIG. 1. System control processor 100 controls interaction of the graphics display system with a host processor through communication line 102. Internal I/O processor 104 is connected to operator control devices such as a keyboard, tablet and stylus, program function keys, and other necessary operator devices. The system control processor directs the execution of graphics orders by graphics control processor 106. System control processor 100 and graphics control processor 106 exchange data through shared system memory 108 with the system control processor 100 receiving display orders from the host system and storing them for execution by the graphics control processor 106. Graphics control processor 106 decodes graphics drawing orders and passes them to pipeline processors 110 for transformation, clipping, mapping, and picking. Pick detect logic 112 is part of the graphics processing pipeline. Finally pixel drawing processor 114, another part of the pipeline, is responsible for rendering the final image by drawing the revel ant pixels into video pixel memory 116. Video pixel memory 116 is accessed by circuitry necessary to produce the resultant image on display device 118 which can be a video display monitor, hardcopy printer, or similar device.

The picking process is accomplished, according to the present invention, by pick detect logic 112. I/O processor 104 monitors the position of operator selection devices such as a stylus and tablet. System control processor 100, in the preferred embodiment, periodically samples I/O processor 104 to determine whether the position of operator selection device has changed. If the position has changed, system control processor 100 interrupts graphics control processor 106 and transmits the revised X and Y coordinates (in screen coordinate space) of the operator selection device. Graphics control processor 106 determines the pick window boundary as positions Xmin, Xmax, Ymin, Ymax and loads these values into registers in pick detect logic 112 through control line 107. The pick window is typically a square of pixels, e.g. 24×24, surrounding the X,Y position of the operator selection device. The extent of the pick window is calculated from the X,Y coordinate.

Graphics control processor 106 is responsible for decoding graphics orders and sending them to pipeline processors 110, sick detect logic 112, and drawing processor 114 for transformation, pick detection and pixel drawing. The pipeline processors 110 operate on specified vertices of graphics primitives such as polylines, polygons, and other geometric shapes. It is only the step of drawing pixels (114) that translates the two vertex coordinates defining the end points of a line into pixels for storage in the video pixel memory 116 and displayed upon display monitor 118. The pipeline operates to transform and map the vertices. For example, a polyline command may request the drawing of line segments between a number of specified points. Pipeline processors 110 first transform each of the specified vertices through application of translation, scaling or rotation commands in world coordinate space (three dimensional). The pipeline processors 110 then clip the resultant image in three dimensions according to a defined window. Next, the pipeline processors 110 map the three dimensional data in the window to a two dimensional viewport. At this point each vertex is specified in two dimensional screen coordinates.

Pick detect logic 112 according to the present invention operates on vertex information specified in two dimensional screen coordinates. The pick detect logic attempts to determine when a match has occurred, i.e., whenever a line connecting two vertices will pass through the defined pick window. Graphics control processor 106 is responsible for determining whether the match indicates that an actual pick has occurred based upon application parameters. For example, in the system of the preferred embodiment, graphics control processor 116 can be set to signal a pick for the first object to be drawn through the pick window, the last object to be drawn through the pick window, or for all objects drawn through the pick window. Whenever the pick detect logic 112 detects a match it interrupts graphics control processor 106 for pick interrupt handling. Graphics control processor 106 takes the application specified action, then resets the interrupt in the pick detect logic, which restarts the pipeline processors and resumes processing.

Figure 2:
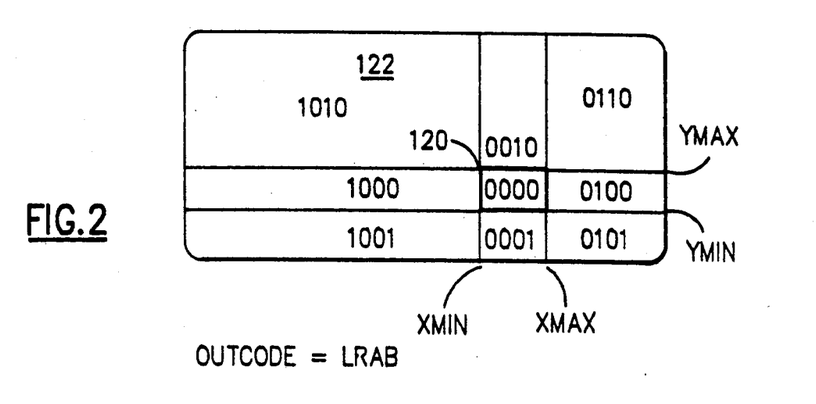
FIG. 2 is an illustration of a pick window used to described the present invention.

The pick detect logic according to the preferred embodiment of the present invention implements a form of pick detection based on the Cohen-Sutherland clipping algorithm. The Cohen-Sutherland clipping algorithm is described in more detail in Foley and Van Dam, *Fundamentals of Interactive Computer Graphics* (1982), pp. 146-149. Cohen-Sutherland perform clipping by dividing screen space into nine regions. Similarly, pick detect logic according to the present invention divides the screen into nine regions for pick detection. A pick window specified by the operator can be defined by four points, viz. Xmin, Zmax, Ymin and Ymax. FIG. 2 illustrates the location of the pick window 120 in screen coordinate space. The pick window is typically implemented as a square screen area. Each of the nine regions is identified by an outcode. An outcode contains four bits, each representing the relationship of that region to one of the four points defining the window. The outcode employed in the preferred embodiment of the present invention is defined by one bit indicating whether the region is left of Xmin, one to indicate right of Xmax, one to indicate above Ymax, and one to indicate below Ymin. Thus, the region labelled 122 has an outcode of 1010 indicating that this region is left of Xmin and above Xmax but not right of Xmax or below Ymin. The region defining the pick window has an outcode of 0000.

The Cohen-Sutherland algorithm provides a means for quickly establishing whether or not a line segment defined by two vertices is totally outside the pick window, is definitely in the pick window, or whether further analysis is required. The first two conditions will be labelled "trivially in" and "trivially out". The present invention implements a novel means for processing non-trivial pick conditions, a subject not covered by Cohen-Sutherland.

Figure 3:
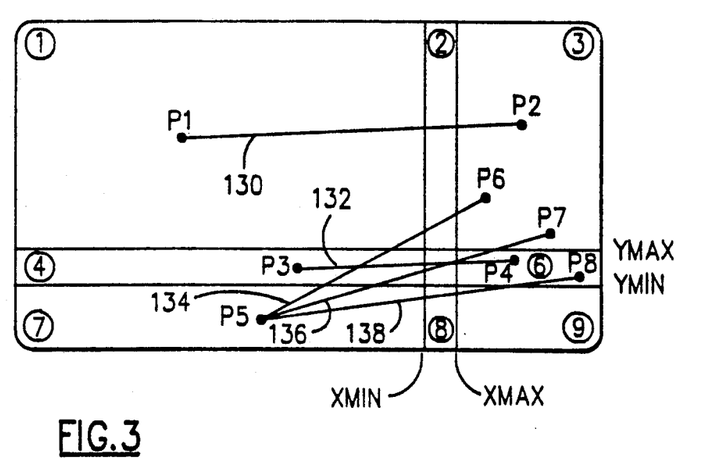
FIG. 3 is an illustration of the graphics display screen used to illustrate the present invention.

FIG. 3 will be used to illustrate picking according to the present invention. Line segment 130 is shown connecting point P1 in region 1 to point 2 in region 3. It can be shown that any straight line connecting a point in region 1 to region 3 can never intersect the pick window. Therefore, line 130 can be declared trivially outside the pick window. In a similar manner, line 132 between points P3 and P4 in regions 4 and 6 respectively, must always intersect the pick window and therefore is trivially accepted. Lines 134, 136 and 138 connecting point P5 to points P6, P7 and P8 respectively illustrate the situation where the line can be neither trivially in or out based solely upon originating and terminating regions. While line 134 connecting points P5 and P6 clearly does not pass through the pick window, line 136 between P5 and P7 does. Therefore it is not possible to generalize on the connection of a line between region 7 and region 3. Any lines connecting these regions must be analyzed in greater detail.

Combinatorial logic is used to combine the outcodes of the line endpoints to determine whether the line passes through the pick window or not. A vector is trivially in if it is not trivially out and:
  a. the outcode of either the first or second point is '0000' or
  b. the outcode of both the first and second points is '00XX', where X can be any value,
  c. the outcode for both P1 and P2 is 'XX00', where X can be any value.

A vector is trivially out if a logical AND of the outcode of the first point with the second point is not equal to '0000'. If the vector does not meet any of these criteria then further analysis is required to determine whether it is to be accepted or rejected. Thus, line 130 is trivially out because the logical AND of the codes is not equal to '0000'. Line 132 is trivially in because the outcode of both P1 and P2 is 'XX00'. Lines 134, 136 and 138 meet none of those criteria.

The non-trivial cases must consider the actual path of the line defined by the end points. If the first point is defined as (X1, Y1) and the second by (X2, Y2) then the pick detect logic must evaluate the following line equation:

$$(Y-Y1)-M(X-X1)=0$$

M is the slope of the vector connecting the two points and X,Y is a point on the line. Replacing M in terms of the end points of the line the following equation can be derived:

$$(Y-Y1)(X2-X1)-(Y2-Y1)(X-X1)=0$$

Figure 4:
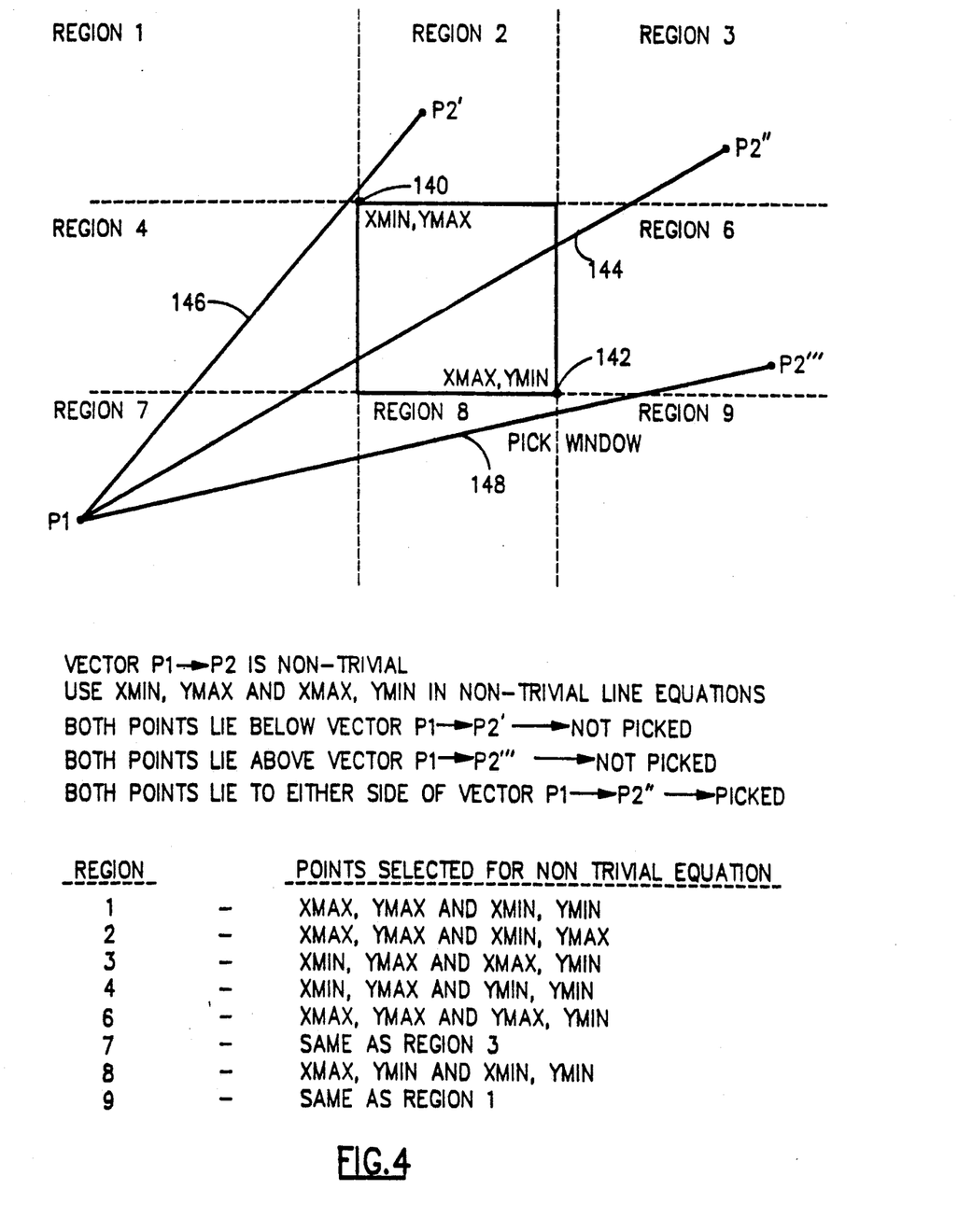
FIG. 4 is an illustration of a pick window used to describe one aspect of the present invention.

The values X and Y represent an arbitrary point on the line. If arbitrary values for X and Y are inserted into the equation but the point X,Y does not lie on the line, the result of the equation will not be 0 but will be some positive or negative number depending on which side of the vector connecting the points X,Y lies. The determination of whether a line between (X1,Y1) and (X2,Y2) crosses the pick window can be tested by inserting two vertices of the pick window into the specified equation and analyzing the results. For example, in FIG. 4 inserting the values for point 140, i.e. (Xmin, Ymax) and point 142 (i.e., Xmax, Ymin), allows the determination of whether the line is within the pick window. Testing of the line equation for line 144 connecting P1 and P2'' will result in one positive sign and one negative sign of the two corners of the pick window. The presence of opposite signs of the results indicate that the line passes through the pick window. The evaluation of lines 146 or 148 will result in either two positive or two negative values indicating that the line does not pass through the pick window and should be rejected.

The two points selected for testing in the line equation depend upon the region in which the first point of the line originates. Selection of points to test is made according to the following table.

| REGION | POINT SELECTED FOR NON-TRIVIAL EQUATION |
| --- | --- |
| 1 | (Xmax,Ymax) and (Xmin,Ymin) |
| 2 | (Xmax,Ymax) and (Xmin,Ymin) |
| 3 | (Xmin,Ymax) and (Xmax,Ymin) |
| 4 | (Xmin,Ymax) and (Xmin,Ymin) |
| 6 | (Xmax,Ymax) and (Xmax,Ymin) |
| 7 | (Xmin,Ymax) and (Xmax,Ymin) |
| 8 | (Xmax,Ymin) and (Xmin,Ymin) |
| 9 | (Xmax,Ymax) and (Xmin,Ymin) |

Figure 5:
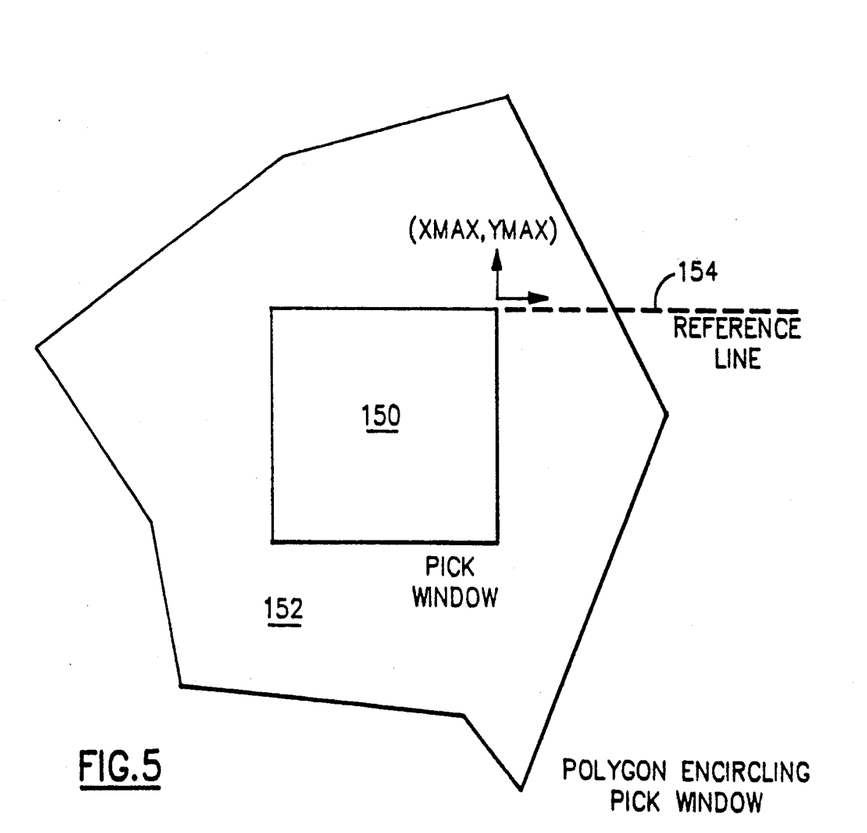
FIG. 5 is an illustration of an encircling polygon in the pick window used to describe the present invention.

The final problem involves identification of the situation where the pick window is entirely encircled, for example, by a polygon. As shown in FIG. 5 pick window 150 is totally encircled by polygon 152. The test discussed above will not detect a match or pick of polygon 152 because none of the edges pass through the pick window. A match or pick is determined by testing a line extending in an arbitrary direction from one vertex of the pick window toward infinity. In FIG. 5 a line is extended from the (Xmax,Ymax) corner to the right. By counting the number of times this line intersects the polygon, a determination of whether or not a match has occurred can be made. The preferred embodiment tests line intersection for each polygon vector processed by the pick detector. A begin polygon order sets the testing mode. The outcode are analyzed and a polygon intersection bit toggled. When the end polygon order is received, if no match has occurred, the polygon intersection is tested. In this example, there is a single intersection indicating that the pick window is entirely contained within the polygon. In general, an odd number of intersections indicates a match while an even number indicates no pick.

Figure 6:
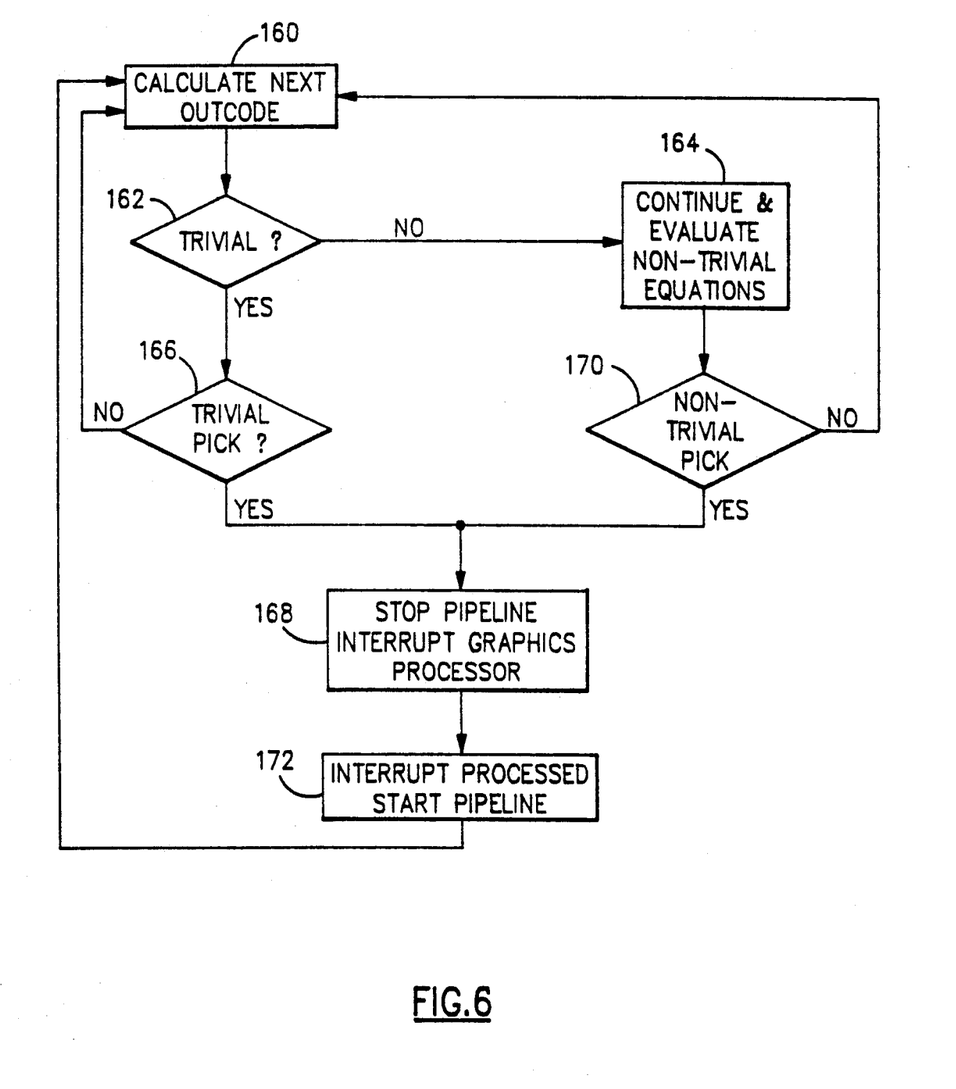
FIG. 6 is a flow chart describing the logic flow of the present system.

The overall logic of the system is represented in FIG. 6. The system first calculates the next outcode (160). (The logic operates in one vertex at a time, no testing can be done on the first outcode. All testing considers the current and previous vertices.) The current and previous outcodes are tested to determine whether a trivial in or trivial out condition exists (162). If none of the trivial tests are true, control passes to step 164 where the non-trivial line equations are evaluated. If a trivial condition exists control passes to 166 where determination of whether a trivial in or trivial out condition has occurred. If trivial out, control returns to outcode calculator 160. Otherwise, control passes to step 168 which stops the pipeline and interrupts the graphics control processor to handle the pick. Similarly, the evaluation results of non-trivial equations 164 is sent to step 170 to determine whether a non-trivial pick has occurred. If none, control returns to step 160 while if a non-trivial pick is detected control passes again to step 168. Once the graphics processor has processed the interrupt, a command is sent to clear the interrupt in the pick detect logic and to restart the pipeline step 172.

Figure 7:
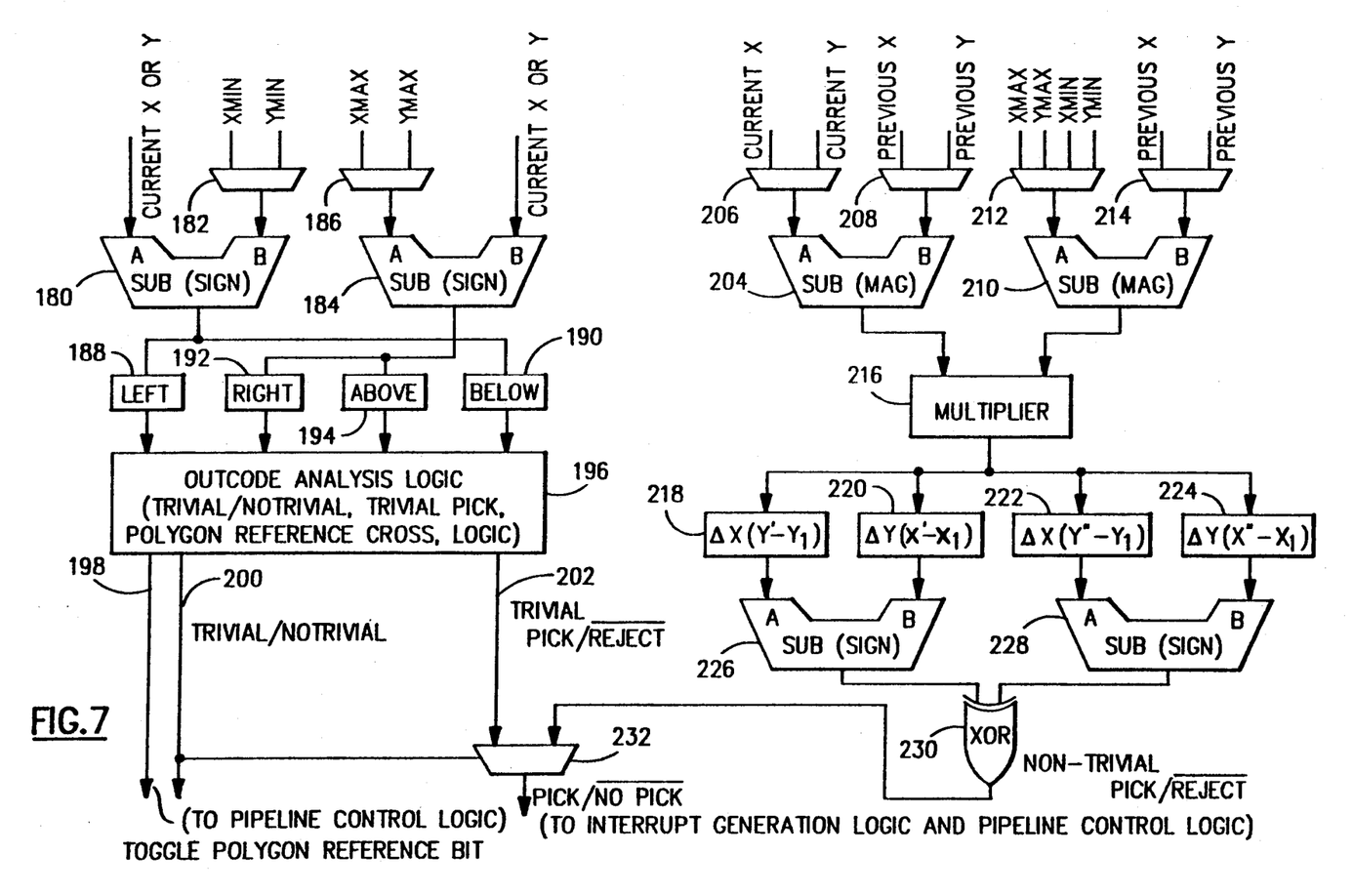
FIG. 7 is a schematic diagram of the apparatus of the present invention.

The present invention has implemented the above pick detection logic in a hardware system shown more completely in FIG. 7. Inputs to pick detect logic are the pick window boundaries, Xmin, Xmax, Ymin, Ymax the previous X and previous Y values of the first point of a vector, and the current X and current Y representing the second point in the vector. The window boundaries are stored in pick detect registers while the current and previous X and Y values are stored in pipeline registers.

The outcodes are determined by the circuitry on the left side of the diagram. Subtraction unit 180 evaluates (X−Xmin) or (Y−Ymin) and passes the sign of the results to the next stage. Similarly 184 evaluates (Xmax−X) or (Ymax−Y). Multiplexers 182 and 186 selects the appropriate window coordinate for the subtraction process. The values of X and Y are alternately passed to pick detect logic by the pipeline registers thus evaluation of one X,Y point requires two processing cycles. The result of the subtraction performed by 180 for the current X is placed in the "left" register 188 while current Y evaluation from 180 is placed "below" register 190. Similarly evaluations from subtraction 184 are placed in "right" 192 and "above" 194. These four registers represent the outocde. Outcode analysis logic 196 applies the logic rules discussed above to determine the presence of a trivial in or trivial out condition. Outcode analysis logic 196 also performs polygon analysis to determine whether the pick window is encircled by a polygon. The outputs of outcode analysis logic 196 include a toggle to the polygon reference bit 198, a trivial or no trivial signal 200, and a trivial or reject 202.

If a non-trivial condition exists, the right side of the logic is used to evaluate the slope of the line in order to detect a non-trivial pick. Subtraction unit 204 subtracts (current X−previous X or (current Y−previous Y) as selected by multiplexers 206 and 208. Subtraction unit 210 subtracts the appropriate previous X or previous Y value from the appropriate pick window coordinate selected by multiplexers 212 and 214. The results of these subtractions are multiplied by multiplier 216 and the results stored in the appropriate register 218, 220, 222, or 224. This processing logic requires four cycles to fill the four registers required to determine whether or not a non-trivial pick has occurred. The first two processing cycles occur concurrently with the processing of the X and Y values through outcode analysis logic. If a non-trivial condition is signalled by outcode analysis 196, then the pipeline is halted, and pick detect logic operates through two additional cycles to complete the other two calculations. When all four registers 218-224 are filled subtraction units 226, 228 calculate the subtracted result which is exclusively ORed 230 to derive a non-trivial pick or reject signal. Multiplexer 232 selects the correct value to be passed to interrupt generation logic and the pipeline control logic.

It will be recognized that alternative circuits could be used to implement the present invention. For example, an additional multiplier with the associated subtraction circuits could be provided so that non-trivial evaluation could occur in two cycles. Similarly, logic can be employed to perform the evaluation during a single cycle.

In the preferred embodiment, the evaluation of trivial accepts or rejects typically occurs in two cycles and does not interrupt the flow of the pipeline. Since a majority of the processing occurs without a pick condition, the pipeline must be halted for additional multiplier evaluation only occasionally.

We claim:

1. A method of detecting operator selection of an object displayed in an image on a display device by a graphics display system, said method comprising repeating the following steps for each vertex for all objects in said image:
   storing pick bounds defining an operator selection area;
   establishing a first coded representation of the relationship of a first object vertex to said pick bounds;
   establishing a second coded representation of the relationship of a second object vertex to said pick bounds;
   logically combining said first and second coded representations;
   testing said logically combined representations to determine whether a line connecting said first object vertex and said second object vertex is either definitely in or definitely outside said operator selection area on the basis of said coded representations;
   if said line is definitely in said operator selection area on the basis of said coded representations, signalling a match event;
   if no definite in or outside decision can be made on the basis of said coded representations, then;
     selecting two vertices of said operator selection area;
     determining the relationship between said line connecting said first object vertex and said second vertex and said two vertices of said operator selection area;
     comparing the relationship determined for said test lines with each other; and
     signalling a match event in accordance with said comparison, said match event being signalled if said test lines are on opposite sides of said line connecting said object vertices.

2. The method of claim 1 wherein the first and second coded representation are 4 bit binary codes with each bit representing a relationship to said pick bounds.

3. The method of claim 2 wherein said step of testing said logically combined representations comprises the steps of:
   if not all zeros, signalling a trivial outside condition;
   if all zeros;
     testing said first and second coded representations;
     if either is all zeros, signalling a trivial in;
     if both contain two initial zeros or two terminating zeros, signalling a trivial in;
   otherwise, signalling a non-trivial condition.

4. The method of claim 1, further comprising the steps of:
   evaluating said first and second coded representations to determine whether a vector between said first and second vertices intersects a line from one of said operator selection area vertices toward infinity;
   if said vector intersects said line, incrementing a counter, testing said counter when processing an end polygon command and, if no match has been signalled;
   signalling a match if said counter is odd.

5. A system for detecting operator selection of an object displayed in an image on a display device, said image generated by a plurality of graphics orders, said system comprising:
   operator position indicating means for an operator to establish a position within said image;
   first memory means for storing a minimum and maximum pick boundary for a first and second dimension, said pick boundaries representing an offset from said operator position, and combined to form vertices of an operator selection window;
   second memory means for storing said graphics orders;
   first processing means for decoding said orders and transmitting object vertex information;
   second processing means for performing graphic transformation on said transmitted vertex information to generate transformed vertex information;

first logic means for generating a coded representation of said transformed vertex information in relation to said pick boundaries;

second logic means for logically combining a first and second coded representation from a first and second object vertex;

third logic means for generating a match signal if said logically combined representation is a trivial pick on the basis of said coded representations, or a non-trivial signal if said logically combined representation cannot be trivially evaluated;

fourth logic means for evaluating a line connecting said first and second object vertices against test lines between one of said object vertices and a selected pair of vertices of said operator selection window; and fifth logic means for comparing said evaluations with each other and for generating a pick signal in accordance with said comparison, said fifth logic means generating said pick signal if said line intersects said operator selection window.

6. The system of claim 5 further comprising:

a third processing means for rendering said vertex information into pixel values;

third memory means for storing said pixel values for display on said display device; and wherein said second processing means is operable in a first mode wherein said transformed vertex information is passed to said third processing means and a second mode wherein nothing is passed to said third processing means.

7. In a computer graphics system containing means for generating an image of a line segment for display within a two-dimensional display area and user-operable means for selecting a rectangular pick window within said display area, a method of determining whether said image of said line segment passes through said pick window, said method comprising the steps of:

for each vertex of a selected pair of vertices of said pick window, generating a vertex signal in accordance with the sign of the quantity:

$$(Y-Y1)(X2-X1)-(Y2-Y1)(X=X1)$$

wherein X1 and Y1 are the coordinates of one endpoint of said line segment, X2 and Y2 are the coordinates of the other endpoint of said line segment, and X and Y are the coordinates of the vertex, said vertex signal indicating the side of said line segment on which the vertex lies;

comparing the vertex signals generated for said selected pair of vertices; and generating a pick detection signal in accordance with the comparison of said vertex signals, said pick detection signal being generated if said vertex signals indicate that the vertices lie on opposite sides of said line segment.

8. A method as in claim 7, further comprising the steps of:

defining a plurality of regions of said display area on the basis of their location relative to said pick window;

determining the region containing each of the endpoints of said line segment;

determining whether said line segment can be classified as either definitely within or definitely outside said pick window on the basis of said region determination; and generating said pick detection signal if said line segment is determined to be definitely within said pick window on the basis of said region determination.

9. A method as in claim 7 in which said two vertices of said pick window are selected on the basis of the position of one of the endpoints of said line segment relative to said pick window.

* * * * *